United States Patent [19]

Henderson et al.

[11] Patent Number: 4,788,653

[45] Date of Patent: Nov. 29, 1988

[54] DIGITAL FILTER FOR POWER SYSTEM STABILIZER

[75] Inventors: Bruce C. Henderson, Troutville; Rainer Hanisch, Roanoke, both of Va.

[73] Assignee: General Electric Company, Salem, Va.

[21] Appl. No.: 945,741

[22] Filed: Dec. 23, 1986

[51] Int. Cl.[4] .................. G06F 15/31; H02K 11/00
[52] U.S. Cl. .................. 364/724.01; 322/58; 364/494
[58] Field of Search .............. 364/724, 494; 322/25, 322/58

[56] References Cited

U.S. PATENT DOCUMENTS 4,080,559 3/1978 Wright et al. .................. 322/58
4,463,306 7/1984 deMello et al. .................. 322/25

Primary Examiner—David H. Malzahn
Attorney, Agent, or Firm—Arnold E. Renner

[57] ABSTRACT

A digital filter for a power system stabilizer in a generator power system. The filter comprises a multi-stage filter having a low DC gain, a phase lead in the region of power oscillations (approximately 0.1 to 2 hertz) of the power system, a torsional reject characteristics (approximately 13.5 to 45 hertz) associated with mechanical resonances of the system, and high attenuation at the fundamental power frequency (e.g. 60 hertz). The filter is comprised of four digital filter sections, the first providing a lead and lag characteristics, the second and third providing a torsional reject characteristic, and the fourth providing a substantially zero DC gain characteristic for the elimination of any DC signal offset as well as a line freqeuncy notch, which tracks the fundamental line frequency. The first section, moreover, comprises a separate stage so that its characteristic can be independently adjusted in the field while the second, third and fourth sections are combined in a composite stage whereby the band reject and signal notch requirements are implemented.

16 Claims, 2 Drawing Sheets

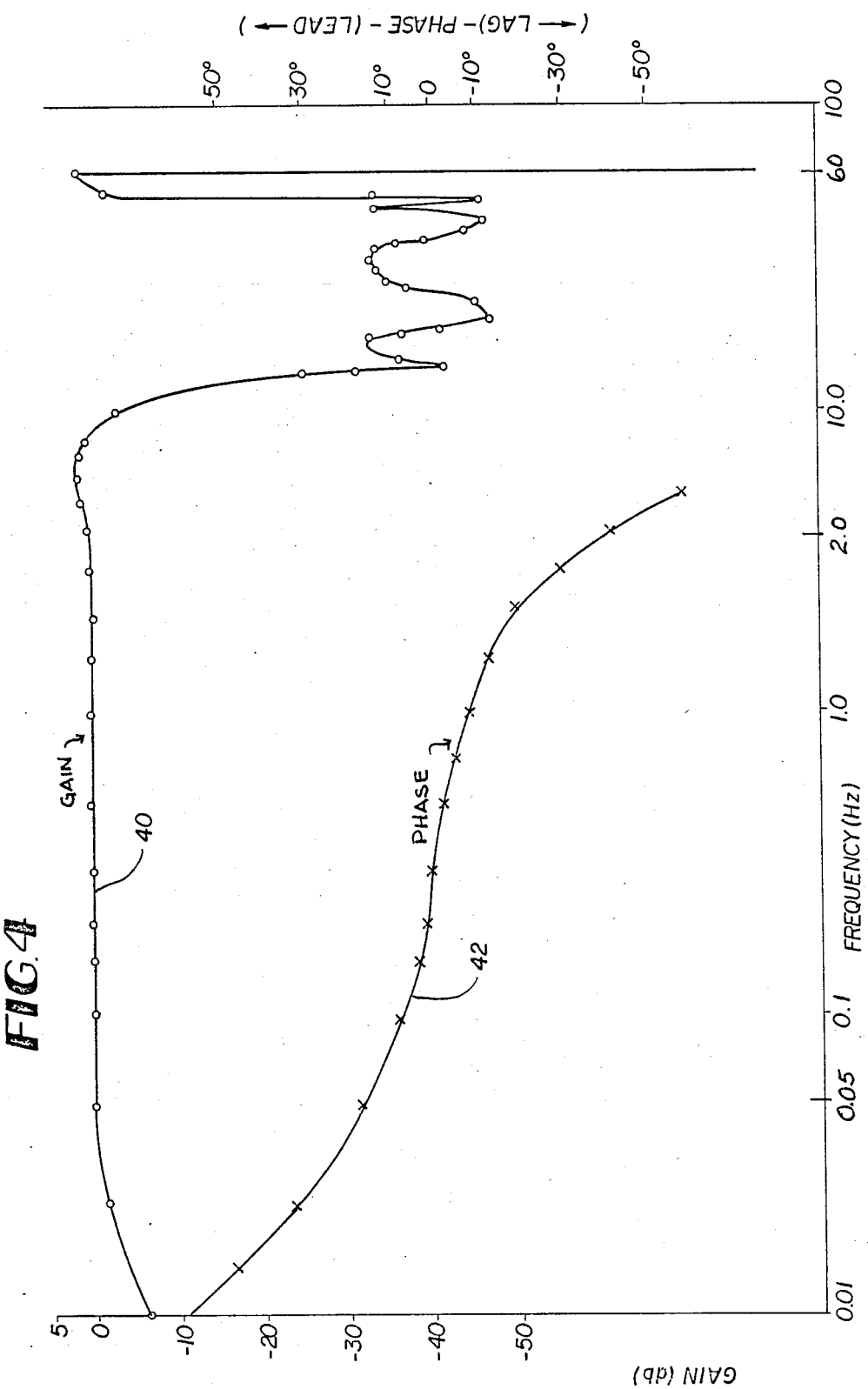

DIGITAL FILTER FOR POWER SYSTEM STABILIZER

REFERENCE MATERIAL

Reference is made to an attached computer program listing applicable to the present invention and which is disclosed in microfiche form. Included is one (1) microfiche containing a total of 37 frames.

CROSS REFERENCE TO RELATED APPLICATION

This application is related to U.S. Pat. No. 4,741,023, issued, Apr. 26, 1988, entitled, "On-Line Test and Diagnostic System For A Poweer System Stabilizer" by R. A. Lawson and which is assigned to the assignee of this invention.

BACKGROUND OF THE INVENTION

This invention relates to a control element for a power system stabilizer and more particularly to a digital filter included in a digital power system stabilizer coupled to the excitation circuitry of a power generation system.

In large power turbine generator installations, the utilization of fast responding electronic equipment for control of the generator field excitation has led to undesired stimulation of mechanical and electrical resonances. This problem has been found to be particularly severe when multiple generators are coupled electrically together or when long transmission lines are required to distribute the generated power.

This problem is generally overcome by the inclusion of a compensating control element called a power system stabilizer (PSS) in the feedback loop which regulates the generator output. A power system stabilizer is a well known combination of electrical circuitry which inserts an adjustable amount of phase lead into the field exciter circuit for compensating the destabilizing phase lags introduced in the power distribution system. The power system stabilizer has been conventionally implemented heretofore by analog techniques by using a multi-section analog filter whose characteristics are designed to provide the required gain and phase response. The multiple requirements that must be met by this filter are quite stringent, however. For example, the resonant frequencies of the undesired power system oscillations modes which must be suppressed are in a narrow band of frequencies approximately between 0.1 and 2 hertz (Hz).

As is well known, a dual lead/lag filter having adjustable parameters normally comprises the primary compensation element. In this relatively low frequency band, the needed phase characteristic leads to a rising gain characteristic as the frequency increases. The filter, however, must also at the same time yield a high attenuation in the frequency band from about 13.5 to approximately 45 Hz in order to avoid exciting the mechanical torsional resonances of the generator. Accordingly, a second filter, termed a torsional filter, is also included in combination with the first to provide a sharp drop in gain in this region. A high-order filter is needed to achieve this attenuation in the stop band but it tends to contribute significant additional phase lag at 2.0 Hz which cancels some of the desired phase lead. A third filter, comprising a notch filter, is also included to attenuate stray signals which appear in the control path at the fundamental alternating current (AC) power frequency, typically 60 Hz. In order to allow minor variations in the line frequency, this notch filter must be made relatively broad and thus can also contribute to undesirable phase lag.

Meeting all of the above mentioned requirements with an analog filter design is relatively difficult and requires the use of expensive components to achieve accurate pole/zero placement and low drift. The problem is further compounded by the need to make the primary lead/lag section adjustable in the field where the power generation installation is located.

SUMMARY OF THE INVENTION

It is an object of the invention, therefore, to provide an improvement in power system stabilizers.

It is another object to utilize digital filtering techniques in a power system stabilizer.

It is a further object of the invention to provide a digital filter in a power system stabilizer having substantially zero drift while obviating the need for high precision analog components.

Still another object of the invention is to provide a digital filter in a power system stabilizer which provides improved balance in the trade off between stopband attenuation and phase lag in the region of power system electromechanical resonances.

Yet a further object of the invention is to provide a digital filter in a power system stabilizer which includes a relatively deep signal notch having a center frequency which tracks minor variations in the power line frequency.

The foregoing and other objects are achieved in accordance with the present invention by an implementation of a multi-stage digital filter having a low DC gain and minimum phase lag in the range of the electromechanical resonances of a turbine generator power system, high attenuation in the range of torsional and natural frequencies associated with two pole generators and high attenuation at the fundamental power system frequency. The digital filter is implemented employing software and is comprised of four sections, the first providing a desired lead/lag characteristic, the second providing a gross torsional filter characteristic, the third providing increased slope in the cut-off frequency portion of the gross torsional filter characteristic, and the fourth providing a zero DC gain or wash-out characteristic as well as a spurious line frequency notch, whose center frequency tracks the power line frequency by locking the sampling frequency to the line frequency. The first section comprises a stage which is implemented separately so that its characteristic can be independently adjusted for frequencies in the approximate range of from 0.1 to 2.0 hertz (Hz) region while the second, third and fourth sections are combined in another stage whose characteristic is designed to deal with the band-reject and spurious signal notch requirements.

BRIEF DESCRIPTION OF THE DRAWING

While the present invention is particularly defined in the claims annexed to and forming a part of this specification, a better understanding can be had of the following description taken in conjunction with the accompanying drawing in which:

FIG. 4 is a set of curves illustrative of the composite filter characteristic provided by a portion of the subject invention.

DETAILED DESCRIPTION OF THE INVENTION

Figure 1:
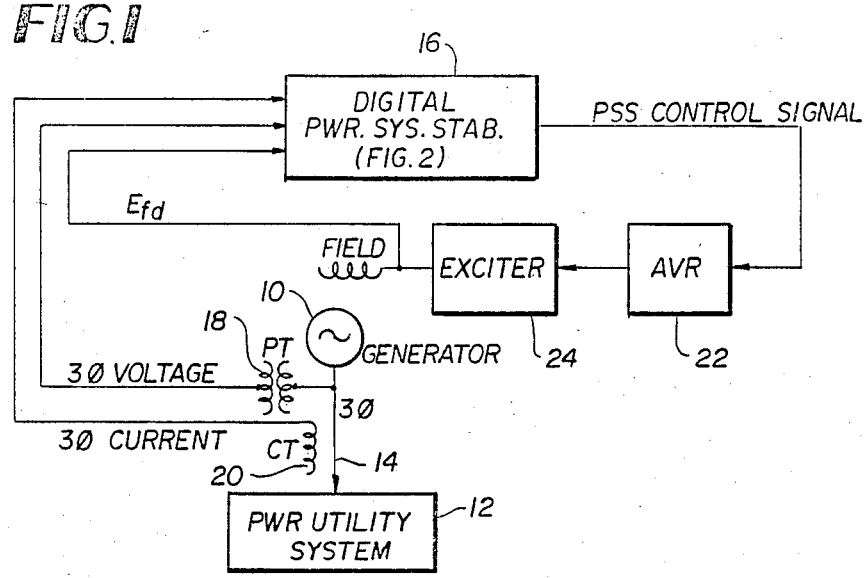
FIG. 1 is an electrical system block diagram illustrative of an electrical turbine generator power system including a digital power system stabilizer connected thereto.

Referring now to the figures and more particularly to FIG. 1, shown is an alternating current (AC) power generation system including an AC generator 10, typically a three-phase, 60 hertz (Hz) turbine generator, which is coupled to a power utility system 12 via a three-phase transmission line 14. In some countries, 50 hertz electrical power is more common. As is well known, such a system can generate undesired electromechanical oscillation modes which are damped, i.e. suppressed, by means of a power system stabilizer (PSS) 16 which receives voltage and current inputs from a set of three-phase potential transformers 18 and current transformers 20. The PSS generates a feedback control signal which is fed to an automatic voltage regulator (AVR) 22 which controls the exciter 24 for the generator 10.

At relatively low power system oscillation frequencies between approximately 0.1 Hz and 2.0 Hz, the AVR 22, exciter 24 and generator 10 combination exhibits a phase lag. The power system stabilizer 16 operates to provide a phase lead to compensate for this phase lag. The turbine generator 10 can also have torsional mechanical resonances whose damping can also be decreased by the action of the power system stabilizer. Since the predominant frequency is the fundamental system frequency, i.e. 60 Hz for a 60 Hz system, the power system stabilizer also provides low gain at the power system fundamental frequency in order to minimize the fundamental frequency noise. Various implementations of a power system stabilizer are known and have been utilized by those skilled in the art.

Figure 2:
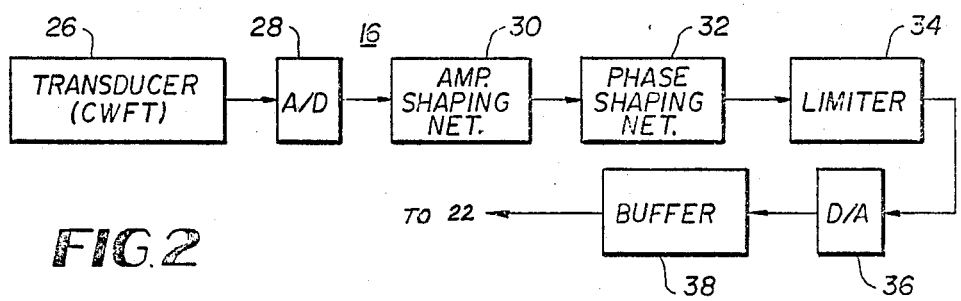
FIG. 2 is an electrical block diagram illustrative of the digital power system stabilizer shown in FIG. 1.

A digital power system stabilizer employing the subject invention is broadly disclosed in block diagrammatic form in FIG. 2. As shown, the PSS 16 is comprised of, inter alia, an analog transducer 26 which may be, for example, a continuous wave frequency transducer (CWFT) which generates a DC analog output signal having an amplitude proportional to deviation in frequency from the power system fundamental frequency (e.g., 60 Hz). The analog signal generated by the transducer 26 is converted to a digital signal by an analog to digital converter 28 for processing by a pair of digital filters 30 and 32 which are respectively comprised of amplitude shaping and phase shaping networks. The output of the phase shaping network filter 32 is next fed to an output limiter 34 which restricts the range of the output signals so that the digital power system stabilizer 16 cannot override normal regulator action during large signal operation. The limited digital signal is then converted back to an analog signal by a digital to analog converter 36 whose output is then buffered by an amplifier 38 where it is then applied to a summing junction, not shown, of the automatic voltage regulator 22 (FIG. 1).

It is to the amplitude shaping filter network 30 shown in FIG. 2 that the present invention is directed. As noted above with respect to an analog filter, a dual lead/lag filter section with adjustable parameters is provided as the primary compensation element for a narrow frequency band between 0.1 and 2.0 Hz. In this band, the needed phase characteristic leads to a rising gain characteristic as the frequency increases. At the same time, the filter must exhibit a high attenuation in the frequency band from about 13.5 Hz to about 45 Hz in order to suppress the mechanical torsional resonances of the generator and accordingly a torsional filter section is included to give a sharp drop in gain. To achieve this attenuation in the stopband, a torsional filter section is added but it tends to contribute significant additional phase lag at 2 Hz, which cancels some of the desired phase lead. A notch filter section is also included to attenuate these signals which appear in the control path at the fundamental AC power frequency.

Recognizing that an ordinary or straight-forward transformation from the known analog filter configuration meeting the above requirements to a digital implementation provides undesired phase lag in the power system stabilizer, the present invention comprises a digital design which meets the foresaid requirements while still providing a needed reduction in phase lag.

The digital filter of the subject invention comprises a software implemented filter having an overall transfer function F(z) and which is comprised of four sections or parts. This transfer function is expressed as:

$$F(z) = \frac{N_1(z) \times N_2(z) \times N_3(z) \times N_4(z)}{D_1(z) \times D_2(z) \times D_3(z) \times D_4(z)} \quad (1)$$

$$= F_1(z) \times F_2(z) \times F_3(z) \times F_4(z) \quad (2)$$

where $N_i$ and $D_i$ comprise coefficients for the numerator and denominator, respectively, $F_1(z)$ provides a lead/lag characteristic, $F_2(z)$ provides a gross torsional filter characteristic, $F_3(z)$ comprises a characteristic which improves the skirt steepness or slope of the $F_2(z)$ characteristic in the cutoff region, and $F_4(z)$ provides a substantial zero DC gain characteristic for the elimination of any DC signal offset as well as a spurious line frequency notch whose center frequency comprises a power line frequency.

Considering the first section $F_1(z)$, it comprises a conventional dual lead/lag filter section which has adjustable parameters to achieve the primary lead characteristics in the bandpass region between 0.1 Hz and 2.0 Hz. Noting that the transfer function of a lead network can be expressed as 1+st, where s is the operator of a Laplace transform and where t is the time constant indicative of a corner or break point frequency, the form, i.e. the transfer function F(z), of a desired lead/lag analog filter for this application becomes:

$$F(z) = \frac{(1 + st_2)(1 + st_4)}{(1 + st_3)(1 + st_5)} \quad (3)$$

Experience with previous analog filter designs for a power system stabilizer has led to recommended initial settings for the time constants for the lead/lag section. The recommended design center for these time constants has been found to be $t_2, t_4 = 0.25$ sec. (lead) and $t_3, t_5 = 0.025$ sec. (lag).

The next step involves a conversion of the analog filter specification defined by equation (3) into a digital implementation. The preferred method for making this conversion comprises the Bilinear Transform method set forth in a textbook entitled, *Digital Filters: Analysis and Design*, by Andreas Antoniou, McGraw-Hill Publishing Co., (1979) and can be referred to, if necessary, to provide additional tutorial information regarding this type of filter design.

Since the Bilinear Transform method requires that the break frequencies for the analog filter be pre-warped prior to conversion, a pre-warping procedure followed results in modified time constants of $t_2$, $t_4 = 0.25$ sec. (lead) and $t_3$, $t_5 = 0.024067$ sec. (lag) being provided. It should be noted that the first two time constants $t_2$ and $t_4$ involve no change.

It can be shown that the digital equivalent of the analog filter specified by the transfer function of equation (3) can be expressed as:

$$F_1(z) = \frac{a_2 z^2 + a_1 z^1 + a_0}{b_2 z^2 + b_1 z^1 + b_0} \quad (4)$$

Applying the Bilinear Transform method outlined in the above referenced text to equation (4) gives the following values for the coefficients:

$a_2 = 63.57171$, $a_1 = 118.94$, $a_0 = 55.63381$ $b_2 = 1$, $b_1 = -.97124$, $b_0 = 0.235827$

Figure 3:
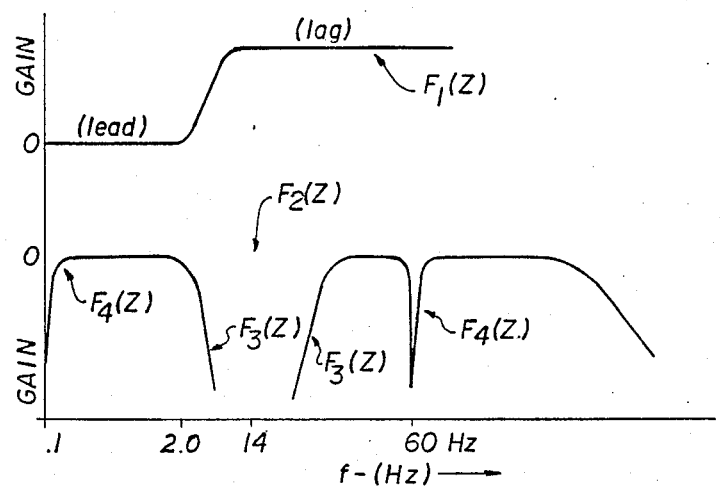
FIG. 3 is a set of characteristic curves illustrative of the overall filter characteristic of the subject invention.

This filter characteristic is represented in FIG. 3 by the reference character $F_1(z)$. As shown it includes a relatively low gain lead portion having a frequency break in the region of 7 Hz where it then rises to a relatively high gain lag portion.

Next a band reject digital filter section $F_2(z)$ having a low pass region below 2.0 hertz is implemented and shown in FIG. 3 having a low cut-off frequency in the region of 7 Hz to begin a stopband region. Since a low order filter is required to minimize the phase lag introduced at 2.0 Hz, a suitable second order filter for the $F_2(z)$ section is designed using a method called the elliptical filter synthesis method, also outlined in the Antoniou text, referenced above. The following transfer function accordingly results:

$$F_2(z) = \frac{K(a_2 z^2 + a_1 z + a_0)}{b_2 z^2 + b_1 z + b_0} \quad (5)$$

where $K = .03976$ $a_2 = 2.988$, $a_1 = 3.441$, $a_0 = 2.99$ $b_2 = 1$, $b_1 = -1.0578$, $b_0 = 0.47797$ Following this, a section $F_3(z)$ is designed and added to $F_2(z)$ and which comprises a complex conjugate pole pair and a complex conjugate zero pair to provide a deep notch at about 14 Hz. The effect of this section is to greatly increase the cut-off slope or skirts provided by the elliptical section $F_2(z)$ while contributing much less phase lag than would be suffered in an equivalent high order elliptical section alone. The form utilized for the $F_3(z)$ is that of a second order biquadratic whose digital representation can be expressed as:

$$F_3(z) = \frac{a_2 z^2 + a_1 z^1 + a_0}{b_2 z^2 + b_1 z^1 + b_0} \quad (6)$$

-continued where:

$a_2 = 0.6236$, $a_1 = -0.126595$, $a_0 = 0.5875$ $b_2 = 1$, $b_1 = 0.7027$, $b_0 = 0.6921$

These two sections are also illustrated in the lower portion of FIG. 3 by the reference characters $F_2(z)$ and $F_3(z)$.

The fourth section $F_4(z)$ is designed to exhibit zero again at DC to prevent an undesired offset from disturbing the PSS and added to $F_2(z)$ and $F_3(z)$ as shown in FIG. 3. This is implemented with a conventional zero DC gain filter; however, it also now involves the selection of the sampling frequency. Because the frequency domain implicitly provides a folding or aliasing effect of the filter characteristic at the sampling frequency in a digital filter design, it is normally undesired and typically requires special analog filtering to preclude the negative effects of aliasing. In the present invention, however, a sampling frequency is selected to be that of the power line frequency, i.e. 60 Hz, and, in effect, turns a liability into an asset by now producing a deep frequency reject notch at 60 Hz, due to the aliased image below 60 Hz, which acts as a filter providing the required attenuation of the stray 60 Hz signals in the system. By proper selection of the location of the filter coefficients of $F_4(z)$, the notch at 60 Hz is made arbitrarily deep and narrow. In the present invention, the sampling frequency is derived from an oscillator, not shown, which is phase locked to the line frequency. This provides an additional benefit in that the notch at 60 Hz will automatically track the line frequency and remain centered on the spurious signal frequency. The digital filter section $F_4(z)$ is designed to have a time constant of 0.1 radians and has the following transfer function:

$$F_4(z) = \frac{z + a_0}{z + b_0} \quad (7)$$

where $a_0 = -1.0$, $b_0 = -.99833$

A composite filter section $F_C(z)$ is next generated from the combination of $F_2(z)$, $F_3(z)$ and $F_4(z)$ which is shown in FIG. 4 and which includes both a torsional and wash-out characteristic. The resulting transfer of $F_C(z)$ becomes:

$$F_C(z) = \frac{a_5 z^5 + a_4 z^4 + a_3 z^3 + a_2 z^2 + a_1 z^1 + a_0}{b_5 z^5 + b_4 z^4 + b_3 z^3 + b_2 z^2 + b_1 z^1 + b_0} \quad (8)$$

where: $a_5 = .074093$, $a_4 = -.003816$, $a_3 = .05634$, $a_2 = -.061293$, $a_1 = .004517$, $a_0 = -.06984$ $b_5 = 1.0$, $b_4 = -2.7587$, $b_3 = 3.6711$, $b_2 = -2.9783$, $b_1 = 1.3971$, $b_0 = -.33027$ In the accompanying computer program listing referenced above, a digital filter in accordance with the subject invention is comprised of two stages as outlined in the foregoing description, but with the torsional rejection filter portion being calculated first followed by a calculation of the lead/lag filter portion. Predetermined filter coefficients are stored in an array of constants (FCON-ARR) and an array of variables (FVAR-ARR) is provided for local storage. A set of subroutines (RELAY-OFF), (SET-ALARM), (RELAY-ON), (SCAN-OPIN) and (CK-AD-COMPL) are unrelated to the actual filter calculation but are utilized to make up the overall product. Initialization, the scanning of the generator phase voltages, diagnostics and event detection are additional functions provided to assure the proper operation of the device.

The filter algorithm starts with an A/D conversion of the filter input which, upon successful completion, is checked for saturation. If a saturation condition exists, the output is left at its old value and no calculation is performed to avoid unnecessary wind up of any filter states. If the torsional rejection filter is disabled (TOR-DIS in FCON-ARR is set true), a high pass filter section is then calculated.

If, however, the torsional rejection filter section is to be calculated, the following difference equation is computed:

$$Y(N) = \quad (9)$$
$$TX0*X(N) + TX1*X(N-1) + TX2*X(N-2) +$$
$$TX3*X(N-3) + TX4*X(N-4) + TX5*X(N-5) +$$
$$TY1*Y(N-1) + TY2*Y(N-2) + TY3*Y(N-3) +$$
$$TY4*Y(N-4) + TY5*Y(N-5),$$

where $X(N)$ denotes the current input sample to the first stage and $Y(N)$ is the current output sample of the first stage. The coefficients are found in the array of constants (FCON-ARR). To reduce any extra phase lag due to calculation delay time, the difference equation (9) is reduced to:

$$Y(N) = TX0*X(N) + T(N-1) \quad (10)$$

with $T(N-1)$ being precalculated every scan in preparation for the next scan.

In a like manner, the double lead/lag stage of the filter is calculated by utilizing the following difference equation:

$$Z(N) = A*Y(N) + B*Y(N-1) + C*Y(N-2) - D*Z(N-1) - E*Z(N-2) \quad (11)$$

where $Y(N)$ denotes the input sample and $Z(N)$ is the output sample. For reasons of speed, the foregoing equation is reduced to:

$$Z(N) = A*Y(N) + L(N-1) \quad (12)$$

where $L(N-1)$ was calculated in the previous scan.

The output sample $Z(N)$ is continuously checked for saturation and any diagnostic testing is honored. Also output clamping is applied before a subsequent digital to analog conversion is initiated. Following this, a post filter calculation is made and a time shifting of the filter states is performed in preparation for the next scan.

The remaining part of the program deals with scanning more analog points, utilizing a spare digital to analog output channel and generating a sine wave modulating signal for certain diagnostic test conditions which do not form part of the present invention.

The computer program implementing the present invention is written in assembly language to run on an Intel 286 microprocessor. It is an interrupt driven program synchronized with the line frequency. The parameters for the lead/lag stage are, furthermore, user changeable and a separate software module is used to modify the filter constant array to reflect new settings.

Having thus shown and described what is at present considered to be the preferred embodiment of the invention, it should be known that the same has been made by way of illustration and not limitation. Accordingly, all modifications, alterations and changes coming within the spirit and scope of the invention as set forth in the appended claims are herein meant to be included.

We claim:

1. A method of digitally filtering signals in a power system stabilizer utilized in an electric power generation system exhibiting transitory electrical power oscillations and mechanical oscillations within a range of frequencies which is a function of said system, comprising the steps of:
    (a) providing an analog signal proportional to changes in line frequency of the power generation system;
    (b) converting said analog signal to a digital signal;
    (c) providing a multi-stage digital filter having a phase lead characteristic relative to said power oscillations, a torsional reject characteristic relative to mechanical resonances of said system, a phase lag characteristic which enhances said torsional reject characteristic, a substantially zero DC gain characteristic, and a notch filter characteristic at said line frequency;
    (d) feeding said digital signal through said digital filter;
    (e) converting the filtered digital signal back to an analog signal; and
    (f) coupling the filtered analog signal to circuit means controlling said power generation system.

2. The method as defined in claim 1 wherein said phase lead characteristic is provided in a range of predetermined frequencies of power oscillations and said phase lag characteristic is provided from above said range at least up to said line frequency.

3. The method as defined by claim 2 wherein said range of predetermined frequencies extends between, approximately, 0.1 and 2.0 hertz.

4. The method as defined by claim 1 wherein said torsional reject characteristic includes a frequency band of, approximately, 13.5 to 45 hertz for a line frequency of 60 hertz.

5. The method as defined by claim 1 wherein said filter exhibits a low pass region in the frequency range of, approximately, 0.1 hertz and 2.0 hertz.

6. The method as defined by claim 5 wherein said filter provides a phase lead within said low pass region.

7. The method as defined by claim 1 wherein step (c) further comprises providing a notch filter having a center frequency locked to and tracking said line frequency.

8. The method as defined by claim 7 wherein said center frequency comprises 60 hertz for a line frequency of 60 hertz.

9. The method as defined by claim 1 wherein said phase lead and phase lag characteristics are provided in one stage of said digital filter and the remainder of said characteristics is provided as a composite characteristic in another stage of said digital filter.

10. The method as defined by claim 9 wherein said phase lead and phase lag characteristics are selectively variable.

11. The method as defined by claim 1 wherein said digital filter of step (c) has a transfer function $$F(z) = F_1(z) \times F_2(z) \times F_3(z) \times F_4(z)$$

where $F_1(z)$ provides said phase lead and phase lag characteristics, $F_2(z)$ and $F_3(z)$ provide said torsional reject characteristic, and $F_4(z)$ provides said notch filter characteristic at said line frequency.

12. The method as defined by claim 11 wherein, $F_1(z)$ comprises the transfer function $$F_1(z) = \frac{a_2 z^2 + a_1 z^1 + a_0}{b_2 z^2 + b_1 z^1 + b_0}$$

where $a_2 = 63.57171$, $a_1 = 118.94$, $a_0 = 55.63381$
$b_2 = 1$, $b_1 = -0.97124$, $b_0 = 0.235827$.

13. The method as defined by claim 11 wherein $F_2(z)$ comprises the transfer function $$F_2(z) = \frac{K(a_2 z^2 + a_1 z + a_0)}{b_2 z^2 + b_1 z + b_0}$$

where $K = 0.03976$,
$a_2 = 2.988$, $a_1 = 3.441$, $a_0 = 2.99$
$b_2 = 1$, $b_1 = -1.0578$, $b_0 = 0.47797$.

14. The method as defined by claim 11 wherein $F_3(z)$ comprises the transfer function $$F_3(z) = \frac{a_2 z^2 + a_1 z^1 + a_0}{b_2 z^2 + b_1 z^1 + b_0}$$

where $a_2 = 0.6236$, $a_1 = -0.126595$, $a_0 = 0.5875$
$b_2 = 1$, $b_1 = 0.7027$, $b_0 = 0.6921$.

15. The method as defined by claim 11 wherein $F_4(z)$ comprises the transfer function $$F_4(z) = \frac{z + a_0}{z + b_0}$$

where $a_0 = -1.0$, $b = -.99833$.

16. The method as defined by claim 11 wherein $F_1(z)$ comprises the transfer function $$F_1(z) = \frac{a_2 z^2 + a_1 z^1 + a_0}{b_2 z^2 + b_1 z^1 + b_0}$$

where $a_2 = 63.57171$, $a_1 = 118.94$, $a_0 = 55.63381$
$b_2 = 1$, $b_1 = -.97124$, $b_0 = 0.235827$ and additionally including the step of combining $F_2(z)$, $F_3(z)$ and $F_4(z)$ into a composite transfer function $F_C(z)$ where $$F_C(z) = \frac{a_5 z^5 + a_4 z^4 + a_3 z^3 + a_2 z^2 + a_1 z^1 + a_0}{b_5 z^5 + b_4 z^4 + b_3 z^3 + b_2 z^2 + b_1 z^1 + b_0}$$

where
$a_5 = .074093$, $a_4 = -.003816$, $a_3 = .05634$
$a_2 = -.061293$, $a_1 = .004517$, $a_0 = -.06984$
$b_5 = 1.0$, $b_4 = -2.7587$, $b_3 = 3.6711$
$b_2 = -2.9783$, $b_1 = 1.3971$, $b_0 = -.33027$.

* * * * *